United States Patent [19]

Pool

[11] 4,435,873
[45] Mar. 13, 1984

[54] BATTERY POST AND TERMINAL CLEANER

[75] Inventor: James L. Pool, Clarinda, Iowa

[73] Assignee: Lisle Corporation, Clarinda, Iowa

[21] Appl. No.: 444,969

[22] Filed: Nov. 29, 1982

[51] Int. Cl.³ .................... B23D 79/08; A47L 13/08
[52] U.S. Cl. ................................ 15/105; 15/104.02; 15/236 R; 408/204
[58] Field of Search ............. 15/236 R, 105, 104.02, 15/104.04, 104.05; 408/204, 205; 145/3.8

[56] References Cited

U.S. PATENT DOCUMENTS 2,562,136  7/1951  Sullins ................................ 15/105
3,284,833  11/1966  Von Tersch et al. ............ 15/236 X
3,802,793  4/1974  Simon ................................ 15/236 X Primary Examiner—Chris K. Moore
Attorney, Agent, or Firm—Allegretti, Newitt, Witcoff & McAndrews, Ltd.

[57] ABSTRACT

An improved battery post and terminal cleaner is comprised of at least two longitudinal blade members each having an outside scraping surface on one end and an inside scraping surface at the opposite end. The blade members are housed in a body member in which they slide in unison to adjust the spacing of the ends of the blade members to accomodate variously sized terminals openings and posts.

7 Claims, 9 Drawing Figures

BATTERY POST AND TERMINAL CLEANER

BACKGROUND OF THE INVENTION

The present invention relates to an improved battery post and terminal cleaner and, more particularly, to a battery post and terminal cleaner having blades which can be adjusted to accommodate battery posts and terminals of varying sizes.

Batteries, such as those used in automobiles, utilize posts cooperative with cable clamps in terminals. The posts and terminals, are subject to corrosion and rust accumulation. Rust and corrosion may impair the operation of the battery making, it is desirable to remove such rust and corrosion from posts and terminals to provide good contacts and, therefore, more effectively use the battery.

A reaming tool is often used to clean the terminal or clamp end of the cable. Such a tool has a set of converging blades rigidly mounted in a holder to form a conically-shaped reamer. This tool works well on clamp ends of various sizes since the reamer may be inserted into the clamp end, then rotated to ream out the clamp opening.

However, a reamer is not useful for cleaning a post. Rather a tool having a series of blades recessed in the side of an opening has been used. Such a tool has not proven to be useful in all circumstances. This results since the top of the battery limits the distance the tool may be pushed over the post. Consequently, such a tool is useful for cleaning only limited sizes of posts.

A spring type cutter is another post cleaner in which cutting blades are biased inwardly by a spring against the side of a post. However, one using such a tool has little control over the blade pressure and too much metal may easily be removed from the post. The present invention was developed to overcome such problems.

SUMMARY OF THE INVENTION

It is an object of the present invention to provide a battery post and terminal cleaner in which the same blades are used to clean both the post and the clamp opening which fits over the post.

A further object of the present invention is to provide a battery post and terminal cleaner which cleans the post with the inside of the blades at one end of the cleaner and the clamp opening with the outside of the blades at the opposite end of the cleaner.

Yet another object of the present invention is to provide a battery post and terminal cleaner in which the blades may be brought progressively closer together by sliding the body of the cleaner down over the blades, thereby adjusting the spacing between the blades to fit various sizes of posts.

Still another object of the present invention is to provide a battery post and terminal cleaner in which the pressure on the scraping blades may be controlled by the user simply by controlling the force applied to push down on the body of the cleaner, thereby allowing the user to control the amount of material removed from the post and terminal.

In a preferred embodiment of the present invention, the battery post and terminal cleaner is comprised of at least two longitudinal blade members each having an outside scraping surface on one end and an inside scraping surface at the opposite end. The blade members are housed in a body member adapted to receive the blade members and define a frustoconical blade arrangement. The blades are slidable in the body member to adjust the spacing of the blade members at the ends.

These and other objects, advantages and features of the present invention will be set forth in the detailed description which follows.

BRIEF DESCRIPTION OF THE DRAWING

In the detailed description which follows, reference is made to the drawing comprised of the following figures.

DETAILED DESCRIPTION OF THE PREFERRED EMBODIMENT

Figure 1:
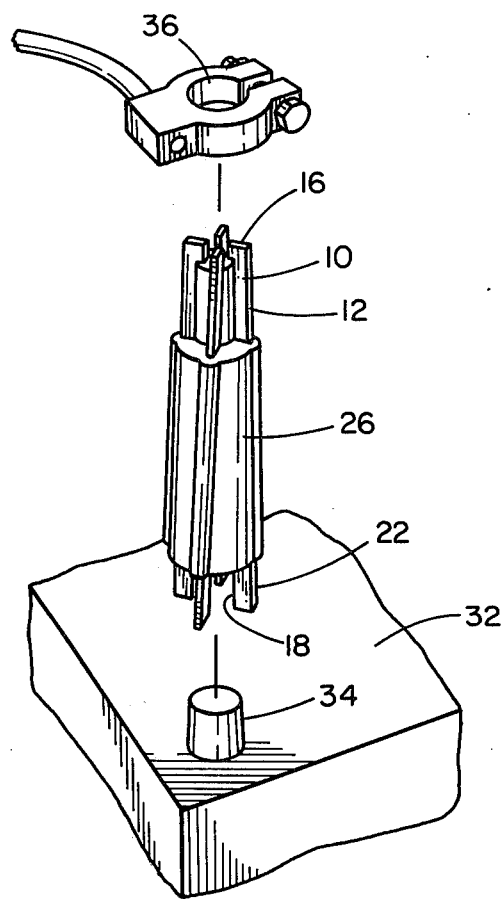
FIG. 1 is a perspective view of the battery post and terminal cleaner of the present invention illustrating the manner in which it may be used.
Figure 2:
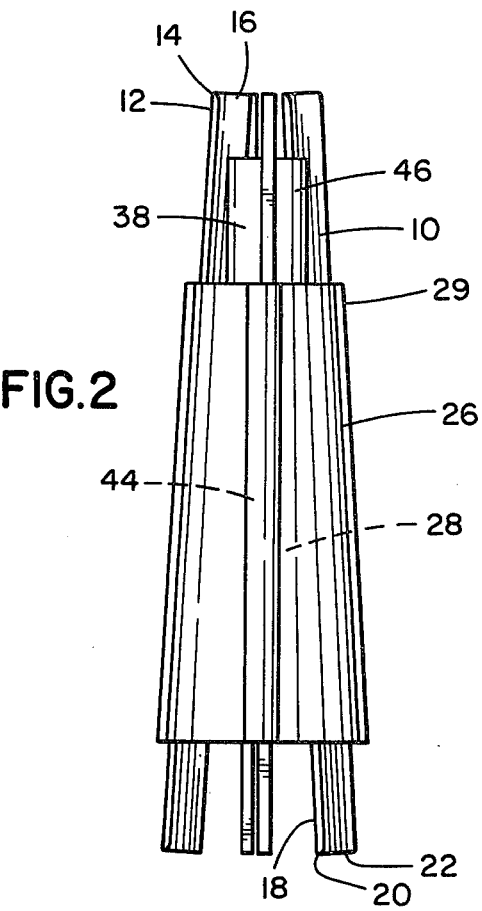
FIG. 2 is a front view of the battery and terminal cleaner of the present invention.
Figure 3:
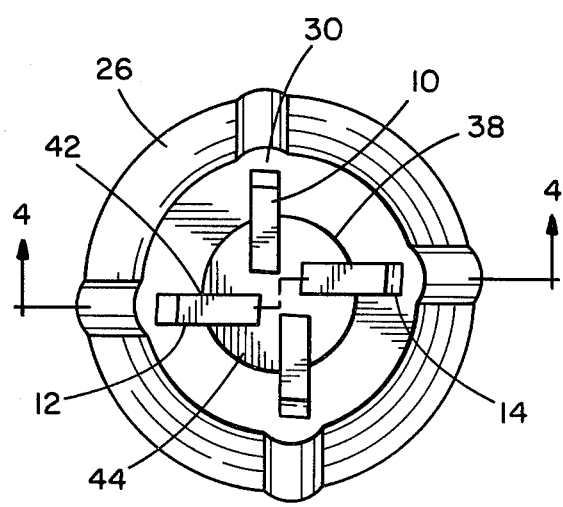
FIG. 3 is a top view of the battery post and terminal cleaner of the present invention.

The cleaner includes a plurality of blade members 10, the preferred number being four, each having a planar outside scraping surface 12 intersecting with transverse side surfaces 13, 15 to define outside cutting edges 14, 17 at one end 16 of the blade member 10, and a planar, inside scraping surface 18 intersecting with the transverse side surfaces 13, 15 to define inside cutting edges 20, 21 at the opposite end 22 of the blade member 10. Each blade member 10 has an inside edge slot or recess 24 located approximately midway between the ends 16, 22.

The blade members 10 are retained in a body member 26. Body member 26 has a frustoconical interior cavity 28 with a plurality of radially extending and spaced longitudinal slots 30 each of which is adapted to receive a blade member 10. The slots 30 open on the cavity 28 and converge toward narrow end 29 of the frustoconical cavity 28. The blade members 10 are longitudinally slidable in the slots 30 and are arranged with the outside surface 12 facing outwardly. The outside surface 12, inside surface 18 and cutting edges 14, 15, 20, 21 of the blade members 10 are angled at approximately 5° from the longitudinal axis 23. Each of the blade members 10 is positioned in a separate slot 30 so that the appropriate edges 14, 15, 20, 21 will engage an approximately circular post 34 or terminal opening 36 as the case may be.

The blade members 10 are preferably rectangular parallelepipeds which extend beyond each end 27, 29 of cavity 28 so that the outside or inside cutting edges 14, 15, 20, 21 are sufficiently exposed to cooperate with a terminal opening or post.

Figure 4:
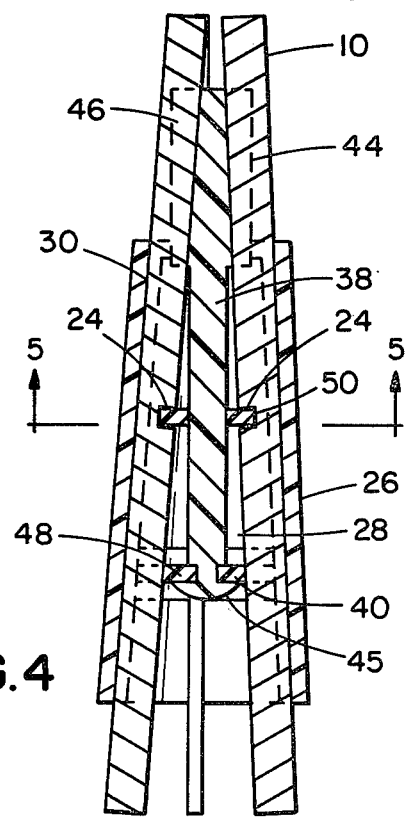
FIG. 4 is a cross sectional view of the battery post and terminal cleaner of the present invention.
Figure 5:
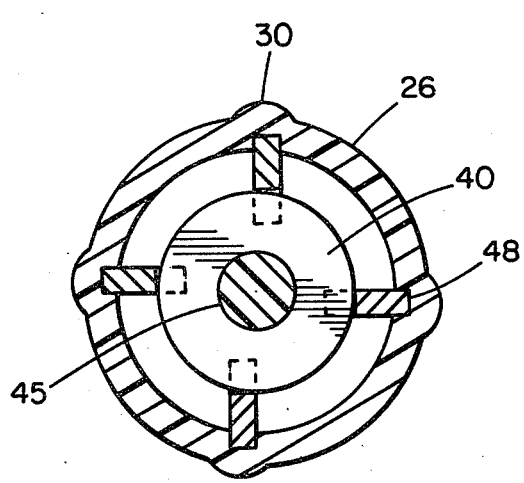
FIG. 5 is a bottom view of the battery post and terminal cleaner illustrating the guide mechanism of the present invention.
Figure 6:
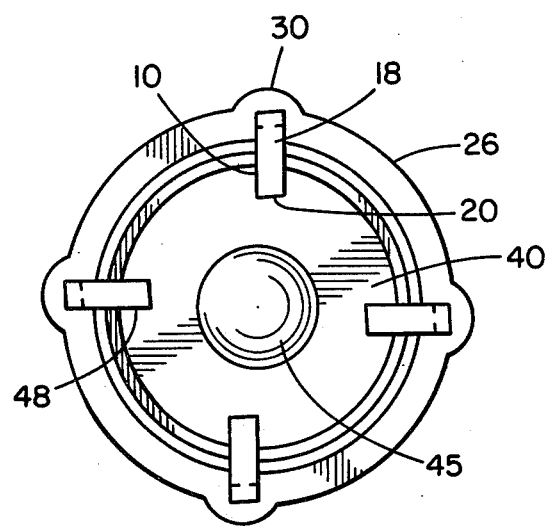
FIG. 6 is a bottom view of the battery post and terminal cleaner of the present invention.
Figure 7:
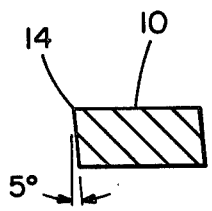
FIG. 7 is a side view of a blade member of the battery post and terminal cleaner illustrating the cutting edge of the blade member.

With reference to FIGS. 4–6, a blade guide mechanism 38 is disposed inside cavity 28. Guide mechanism 38 retains the blade members 10 in the slots 30 at a fixed angle inside body member 26. The guide mechanism 38 includes a guide disc 40 and cooperative guide pin 44. Disc 40 is attached to body member 26 so that disc 40 and pin 44 are immovable relative to body member 26. Disc 40 has a number of notches 42 therein corresponding to the number of blade members 10. The notches 42 are aligned with slots 30 so as to retain the blade members 10 at a fixed angle, in a converging relationship with respect to the longitudinal axis of body member 26 in the slots 30.

Center pin 44 lies on axis 23 and extends outwardly from disc 40 towards the converging end 16 of the blade members 10. Center pin 44 is affixed to guide 40 by means of a heat rivet 45. Center pin 44 has a head or outer end 46 defining a plurality of slots 48 which are in alignment with the notches 42 in guide 40 and slots 30 in body member 26. Slots 48 receive the blade members 10, thereby holding the blade members 10 at the fixed converging angle equal to the convergence determined by slots 30.

A rod section 47 of pin 44 connects head 46 and rivet 45. An annular washer 50 is adapted to be longitudinally slidable along rod section 47. The outer edge of washer 50 is received by the recess 24 in each of the blade members 10. In this fashion, the blade members 10 are kept aligned in body member 26, and slide together in slots 30 since the blades are interlocked by washer 50.

When the post and/or terminal openings of a battery 32 need to be cleaned, the spacing of the blades 10 at the converging end 16 or diverging end 22 may be adjusted to accomodate a terminal 36 or post 34 of varying diameter as the case may be. This is accomplished by sliding blades 10 in body member slots 30 to bring the blades 10 progressively closer together or further apart to the desired spacing.

Figure 8:
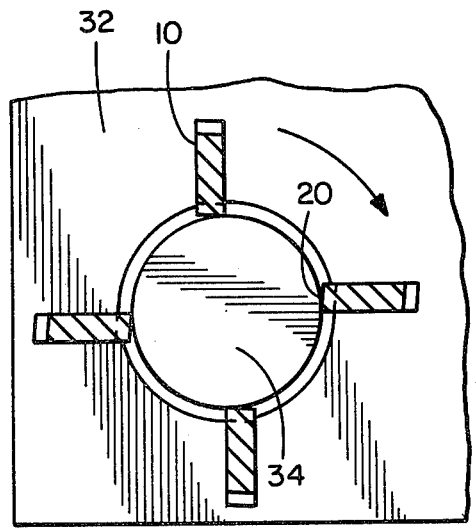
FIG. 8 is a cross sectional plan view illustrating the operation of the battery post and terminal cleaner of the present invention in cleaning a post.
Figure 9:
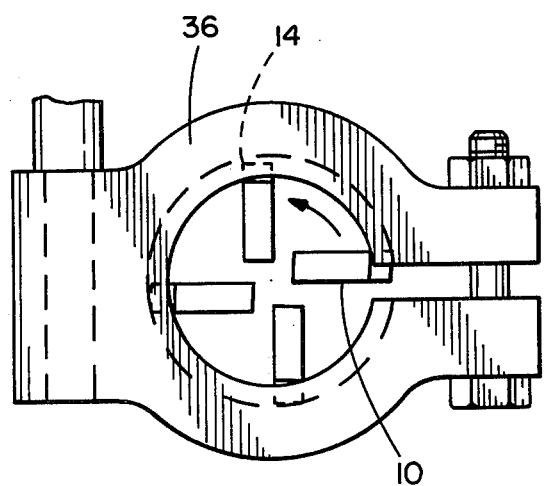
FIG. 9 is a cross sectional plan view illustrating the operation of the battery post and terminal cleaner of the present invention in cleaning a terminal.

The operation of the present invention is thus illustrated in FIGS. 8 and 9. The blades 10 are pushed to one side or the other of body member 26 depending on the size of the post 34 or terminal opening 36 to be cleaned. As previously described herein, the spacing of the ends of blade members 10 can be adjusted by sliding the body member 26 relative to the blades 10 until the desired spacing is attained.

The outside scraping surfaces 12 and cutting edges 14 are used to clean a terminal 36. The end 16 is placed inside terminal 36, adjusted according to the size of the terminal opening by moving the body 26 relative to the blades 30 and rotated to remove rust and corrosion. The amount of material removed by the scraper is controlled by controlling the manual pressure on the blade members 10.

The inside scraping surfaces 18 and cutting edges 20 are used to clean a post 34. The cleaner at end 22 is placed around the post, adjusted according to the size of the terminal opening by moving the body 26 relative to blades 30 and rotated to clean post 34. The amount of material removed is also manually controlled. The relative uniform sliding movement of the blades 10 relative to the body 26 permits adjustment of the scraper to accomodate all sizes of terminal openings and battery posts.

Although the present invention is particularly suitable for use with battery posts and terminals, it can be used to clean surfaces of approximately circular objects by removing surface deposits through the cooperation of the blade members 10 of the present invention and the surface of the object to be cleaned.

It should be understood that the foregoing disclosure emphasizes certain specific embodiments of the present invention and that all modifications or alternatives equivalent thereto are within the spirit or scope of the invention as set forth in the appended claims.

What is claimed is:

1. An apparatus for cleaning posts and terminals comprising in combination:
    (a) at least two longitudinal blade members, said blade members having an outside scraping surface at one end and an inside scraping surface at the opposite end; and
    (b) a body member, said body member having a slot for receipt of each of said blade members intermediate said ends, said blade members being longitudinally slidable in unison in said slots to adjust the spacing of said blade members at said ends to accomodate posts and terminals of varying diameters.

2. An apparatus as in claim 1 wherein said slots are longitudinal slots, each one of said slots adapted for receipt of a blade member, said slots converging toward the end of said outside scraping surface, said blade members being longitudinally slidable in unison in said slots.

3. An apparatus as in claim 1 wherein said blade members have outside and inside cutting edges on said outside and inside scraping surfaces, said cutting edges being radially positioned so that said cutting edges will engage a generally circular post and terminal opening.

4. An apparatus as in claim 1 wherein said body member comprises a hollow frustoconical body having a plurality of slots on the inside surface and also including a guide attached to the inside of the body cavity, said guide having a plurality of notches therein for receiving said blade members and retaining said blade members at a fixed angle with respect to the longitudinal axis of said body in the body slots.

5. The apparatus of claim 1 including a connecting member attached to each of said blades to move the blades in unison upon movement in the body member.

6. An apparatus for cleaning posts and terminals comprising in combination:
    (a) a plurality of blades, said blades having an outside scraping surface at one end and an inside scraping surface at the opposite end;
    (b) a body member, said body member having a frustoconical inside cavity, said cavity having a converging array of slots extending uniformly toward a longitudinal axis of the cavity, each of said slots being adapted to slidingly receive one of said blades to adjust the spacing between said blades at said ends;
    (c) a guide, said guide having a plurality of notches therein for receiving said blades and retaining said blades in a converging relationship in said body member slots; and
    (d) a blade connecting member connected simultaneously to all of the blades and longitudinally slidable therewith to maintain sliding movement in unison of the blades relative to the body member.

7. The apparatus of claim 6 wherein said slots converge toward the end of said outside scraping surface.

* * * * *